United States Patent [19]
Vohl

[11] Patent Number: 5,901,538
[45] Date of Patent: May 11, 1999

[54] BRUSH FELLING HEAD

[75] Inventor: Raynald Vohl, St-Marc-des-Carrières, Canada

[73] Assignee: Vohl Inc., St-Marc-des-Carrières, Canada

[21] Appl. No.: 08/889,849

[22] Filed: Jul. 8, 1997

[51] Int. Cl.[6] ............................ A01D 34/24; A01G 23/08
[52] U.S. Cl. ............................... 56/15.2; 56/295; 56/218; 56/DIG. 14; 144/34.1
[58] Field of Search ...................... 56/13.5, 15.1, 56/15.2, 16.4 R, 255, 295, 229, 218, DIG. 14, DIG. 20, DIG. 24; 144/34.1, 336

[56] References Cited

U.S. PATENT DOCUMENTS

| | | |
|---|---|---|
| 2,736,352 | 2/1956 | Wright . |
| 3,129,549 | 4/1964 | Stauffer . |
| 4,232,719 | 11/1980 | Payton .................................... 144/34.1 |
| 4,468,917 | 9/1984 | Mellgren . |
| 4,739,609 | 4/1988 | Meier et al. ......................... 56/16.4 R |
| 4,769,977 | 9/1988 | Milbourn . |
| 4,850,409 | 7/1989 | Robertson .............................. 144/336 |
| 4,960,157 | 10/1990 | Sheets . |
| 5,123,462 | 6/1992 | Davision . |
| 5,408,814 | 4/1995 | Milbourn . |
| 5,513,486 | 5/1996 | Le Maigat ........................ 56/DIG. 20 |

FOREIGN PATENT DOCUMENTS

| | | |
|---|---|---|
| 931048 | 7/1973 | Canada . |
| 1135599 | 11/1982 | Canada . |
| 1269028 | 5/1990 | Canada . |
| 2052896 | 6/1992 | Canada . |

*Primary Examiner*—Heather Shackelford
*Attorney, Agent, or Firm*—F. Martineau

[57] ABSTRACT

The felling head is operatively installed at the front end of a tractor vehicle, and used for debrushing a brush covered terrain. It comprises a rigid framework, from which downwardly depends a pair of flat, spaced-apart elongated skates that slidingly rest on the ground and support the framework over ground. A pair of discoid saw blades are rotatably supported by the frame, with a ground clearance of a few inches relative to the plane of the skates. The framework is hingedly attached to the tractor vehicle by of a pair of linked parallel parallelograms forced into a common pivotal displacement, each having four rigid bars hingedly attached to one another so as to form a parallelogram configuration. A pair of hydraulic cylinders act on the parallelograms and on the frame, so as to allow vertical linear movement of the frame and a distinct vertical pivotal movement thereof. Thus, when the tractor vehicle pushes the felling head over an uneven ground surface, the elongated skates will be forced under the load of the framework to flatly engage the ground surface, and concurrently the saw blades will be forced to remain parallel to the ground surface with a ground clearance. The felling head further comprises a vertical pivotal axle, to horizontally pivot the saw blades. Outwardly frontwardly divergent arms are provided to convergently bias incoming brush towards the central saw blades.

17 Claims, 6 Drawing Sheets

BRUSH FELLING HEAD

FIELD OF THE INVENTION

The present invention relates to felling heads, and more particularly to a brush felling head for tractor vehicles.

BACKGROUND OF THE INVENTION

Debrushing felling heads are used in many circumstances, for removing brush on a brush covered terrain. The felling head is usually installed on a tractor vehicle, and controlled by the vehicle driver.

A first common application of the debrushing felling heads is in tree plantations, e.g. pine or cedar plantations. The tree rows therein are laterally spaced from one another by about six feet, and the brush will often reach between one foot and four feet in height, and in the latter case can become higher than the growing trees themselves. Of course, this is highly undesirable, since it then hampers significantly the growth of the trees due to the lack of sun light reaching the trees. The motorized debrushing vehicle is destined to be driven between the tree rows to cut down the undesirable brush which grows there.

Usually, manual means are used for removing the brush located between the trees of a same row, where the debrushing vehicle could not reach without damaging or killing the trees, and thus the finishing job is accomplished by hand once the main debrushing operation is done between the rows by the vehicle.

Debrushing is also accomplished in remote locations, such as along highways or power line paths to maintain the right-of-way in these locations, at regular spaced-apart time intervals. A debrushing vehicle can then become very useful, since in such large areas, manual debrushing is out of the question, being too time-consuming.

It is known in the debrushing industry to use debrushing or felling heads installed on tractor vehicles to accomplish this task. These debrushing heads are often equipped with a rotatable circular saw blade which depends from a frame installed at the front end of the tractor vehicle and which is movable relative thereto due to a boom and arm assembly holding the blade. Thus, by selectively moving the blade transversely across the brush, debrushing of the terrain can be accomplished.

Such a brush cutter is shown in U.S. Pat. No. 4,769,977 issued in 1988 to D. E. Milbourn. The brush cutter workhead is installed at the frontward free end of an arm pivotally hinged upon a boom, the latter being hingedly secured to the tractor vehicle. Hydraulic cylinders control the movement and position of the workhead at all times. The workhead comprises inter alia a circular saw blade, the rotating axis of which can be oriented in a rather wide range of angles to allow horizontal, vertical or inclined cutting paths through the brush. However, this workhead cannot be moved sideways relative to the tractor vehicle. Moreover, the operator has to continuously move the workhead to compensate for uneven ground surfaces when debrushing larger areas, to prevent the saw blade from being damaged by engaging the earth, rocks or other natural ground materials with its cutting edge. Although the shroud provided around the blade has walls which project downwardly under the saw blade level, these thin walls are likely to cut through the ground under the weight of the workhead and the force applied thereon by the hydraulic system if forced against the ground, thus effectively allowing the saw blade to reach the ground level and be damaged during use.

This last disadvantage has been partly solved in U.S. Pat. No. 4,468,917 issued in 1984 to P.-G. Mellgren. The brush cleaning apparatus shown in this patent has a frontwardly projecting workhead equipped with a rotatable circular saw blade, supported at the frontward free end of a work arm. The debrushing device of Mellgren also comprises a very large frame installed over and around the tractor vehicle, and pivoted at the approximate center of gravity thereof for vertical displacement of the saw blade. A rounded skid hub downwardly depends under the saw blade axis, to prevent accidental ground engagement of the blade by a sliding engagement of the hub on the ground surface during the tractor vehicle course. This is true for an even flat ground surface.

However, due to the fact that the rounded semi-spherical hub has a single contact point on the ground, if the ground under the blade becomes suddenly uneven or inclined, the blade may be allowed to accidentally engage the ground and damage itself. Indeed, the single ground-contact point hub does not compensate ground sloping, but only height differences of the ground under the blade, upon sliding displacement of the hub over ground.

The Mellgren patent further provides horizontal pivot means linking the work arm assembly to the tractor vehicle, to allow horizontal pivotal displacement of the workhead, so as to confer a moderately wide access range to the saw blade. This is an improvement, when compared to the previously mentioned Milbourn patent.

The Mellgren patent discloses a single saw blade, as with the Milbourn patent.

Canadian patent No. 1,135,599 issued in 1982 to J. Denis shows a pair of circular saw blades installed in side-by-side configuration, and a cover for preventing high velocity airborne projectiles issuing from the blades to endanger the immediate environment around the rotating blades. The two saw blades rotate in opposite directions, so as to draw the brush between them and then accomplish a shearing effect thereon, combined with the cutting properties of each blade. The blades rotational axes are slightly longitudinally offset relative to the direction of travel of the vehicle, so as to allow them to be slightly inwardly offset towards one another. A radial play has to exist between the two coplanar blades, to prevent them from highly undesirable mutual contact during use, and the longitudinal and inward offsets allow the blades to prevent a brush plant or tree from being engaged, along a line parallel to the direction of travel, between the two blades and remain at least partly uncut, due to this play. However, this offset of the blades may result in an unstable engagement of the blades upon larger trees, due to the unequal engagement of the two blades on the tree.

The Denis patent moreover requires the controller to adjust the vertical height of the saw blades relative to the ground continuously, to prevent ground engagement thereof, as with the Milbourn patent.

OBJECTS OF THE INVENTION

It is therefore the gist of this invention to provide a brush felling head that allows debrushing with suitable cutting means, while concurrently self-adjusting the height of the cutting means relative to the ground without the intervention of the tractor vehicle driver.

Another object of the present invention is to provide brush converging means for biasing the brush towards the cutting means.

It is another object of this invention that the cutting means be a pair of overlapping discoid saw blades.

SUMMARY OF THE INVENTION

The present invention relates to a brush felling head for tractor vehicles.

More particularly, the present invention relates to a felling head for debrushing brush covered terrain, destined to be operatively installed at the front end of a tractor vehicle, comprising:

- a) a rigid workhead frame defining a front end and a rear end;
- b) hinge means for pivotally linking said workhead frame to the tractor vehicle and for allowing at least pivotal displacement about a horizontal axis and a linear vertical displacement of said workhead frame relative to the tractor vehicle;
- c) a cutting member defining a flat lower surface and being installed on said workhead frame front end, said cutting member lower surface being destined to clear ground level and to be substantially parallel thereto in an operative debrushing position;
- d) at least two laterally spaced elongated ground engaging members, fixedly and integrally anchored to said workhead frame, located vertically beneath the plane of said flat cutting member lower surface and being parallel thereto; and
- e) power means, for rotatingly powering at least said cutting member;

wherein in said operative debrushing position, said ground engaging members continuously engage the ground under the bias of the load of said workhead frame during forward motion of said tractor vehicle, to maintain said cutting member flat lower surface substantially parallel to the ground and to maintain automatic ground clearance thereof.

Preferably, the brush felling head further comprises hydraulic means acting on said hinge means and on said workhead frame for selectively and remotely controlling the vertical position and the orientation around a horizontal axis of said workhead frame relative to the tractor vehicle, and further for dampening vertical movements of said workhead frame when said ground engaging members temporarily release ground under major ground surface variations.

Preferably, said cutting member comprises a lower and an upper discoid saw blades rotatably fixed to said workhead frame so as to be rotatable in opposite directions, with said lower blade being slightly vertically downwardly offset relative to said upper blade and constituting said cutting member flat lower surface, said lower and upper blades having vertically partly overlapping rotational cutting paths.

Preferably, each said discoid saw blade comprises a lower and an upper adjacent, axially aligned, overlying, distinct and integrally fixed discs having a common outer periphery, said discs being provided with a number of equally peripherally spaced, fixedly attached though removable teeth radially projecting beyond said outer periphery and nested alternately under and over said blade in openings made in the corresponding said lower or upper disc.

Preferably, the brush felling head further comprises brush converging means integrally installed on said workhead frame and projecting ahead of said front end in a divergent fashion, for biasing the brush in a convergent fashion towards said pair of saw blades.

Preferably, said brush converging means comprises a pair of rigid arms frontwardly projecting ahead of said workhead frame front end in a divergent fashion.

Preferably, said hinge means comprises a horizontal pivot member for further selectively allowing sideward pivotal displacement of said workhead frame.

Preferably, said ground engaging means is a pair of flat, elongated, laterally spaced-apart skates integrally installed on said workhead frame near said cutting members.

Preferably, said hinge means comprises at least one parallelogram including four hinged, rigid bars, said hydraulic means acting on said at least one parallelogram and on said workhead frame for controlling the position of the latter.

The present invention also relates to a felling head for debrushing brush covered terrain, destined to be operatively installed at the front end of a tractor vehicle, comprising:

- a) a rigid workhead frame defining a front end and a rear end;
- b) hinge means comprising a pair of parallel parallelograms forced into common pivotal movements, each said parallelogram having four rigid bars hingedly attached so as to form a said parallelogram, said hinge means being destined to pivotally link said workhead frame to the tractor vehicle and to allow pivotal displacement about a horizontal axis and a linear vertical displacement of said workhead frame relative to the tractor vehicle;
- c) a lower and an upper discoid saw blades rotatably fixed to said workhead frame so as to be rotatable in opposite directions, with said lower blade being slightly vertically downwardly offset relative to said upper blade, said lower and upper blades having vertically partly overlying rotational cutting paths, said lower saw blade being destined to be located slightly over ground and substantially parallel thereto in an operative debrushing position;
- d) a pair of flat, elongated, laterally spaced-apart skates integrally and fixedly installed on said workhead frame near said saw blades, being parallel thereto and at least slightly under the level thereof;
- e) a pair of hydraulic cylinders acting on said parallelograms and on said workhead frame for selectively and remotely controlling the vertical position and the orientation around a horizontal axis of said workhead frame relative to the tractor vehicle, and further for dampening the movements of said workhead frame when severe ground level gradients are encountered; and
- f) power means, for powering said saw blades into rotation and for powering said hydraulic cylinders;

wherein in said operative debrushing position, said skates continuously engage the ground under the bias of the load of said workhead frame during forward motion of said tractor vehicle, to maintain said lower and upper blades substantially parallel to the ground and to maintain automatic ground clearance thereof.

The invention further relates to a felling head assembly for attachment to the chassis of a motor vehicle ahead thereof, the felling head assembly comprising:

- a) an open rigid main frame;
- b) a pair of first and second saw mounts, rotatably mounted to said main frame parallel to one another and in laterally spaced fashion, each saw mount including an elongated upright rotatable shaft, a housing for enclosing at least part of said shaft, and a rotatable cutting blade transversely mounted integrally to a bottom end of each said shaft and adapted to cut about a horizontal plane, with each of said cutting blades defining a peripheral cutting edge margin;
- c) first power means, for power rotating said first and second rotatable shafts in counterrotation relative to one another;

d) a pair of fore and aft extending longitudinal skate members, mounted on laterally opposite sections of the bottom face of said main frame and located in radially outwardly spaced fashion from the corresponding said counterrotating blades, said skate members extending within a plane parallel to and being downwardly offset from said saw blades so that a ground clearance is positively maintained between said saw blades including said peripheral cutting edge margins thereof and the underlying ground level, for preventing blade damage as well as for providing optimum brush stumps felling height;

e) attachment means, for releasable coupling of said felling head to the motor vehicle, and including a parallelogram linkage, hingedly mounted at its front end to said felling head main frame for both up and down motion and concurrent fore and aft motion of said felling head, and a hitch coupling, for pivotally mounting the rear end of said parallelogram linkage to a hitch anchor member integral to the motor vehicle chassis for lateral shifting motion of said felling head sidewisely of the motor vehicle; and f) second power means, including integral dampening means and cooperating with said parallelogram linkage to maintain said saw blades within a selected planar cutting orientation relative to ground; said second power means further enabling power fore and aft tilting, power lifting, power lowering, and lateral power tilting of said felling head main frame and associated cutting blades relative to the motor vehicle, said second power means further providing dampening effect on the swinging motions of said felling head responsively to ground level irregularities upon forward displacement of the motor vehicle.

DETAILED DESCRIPTION OF THE PREFERRED EMBODIMENTS

Figure 1:
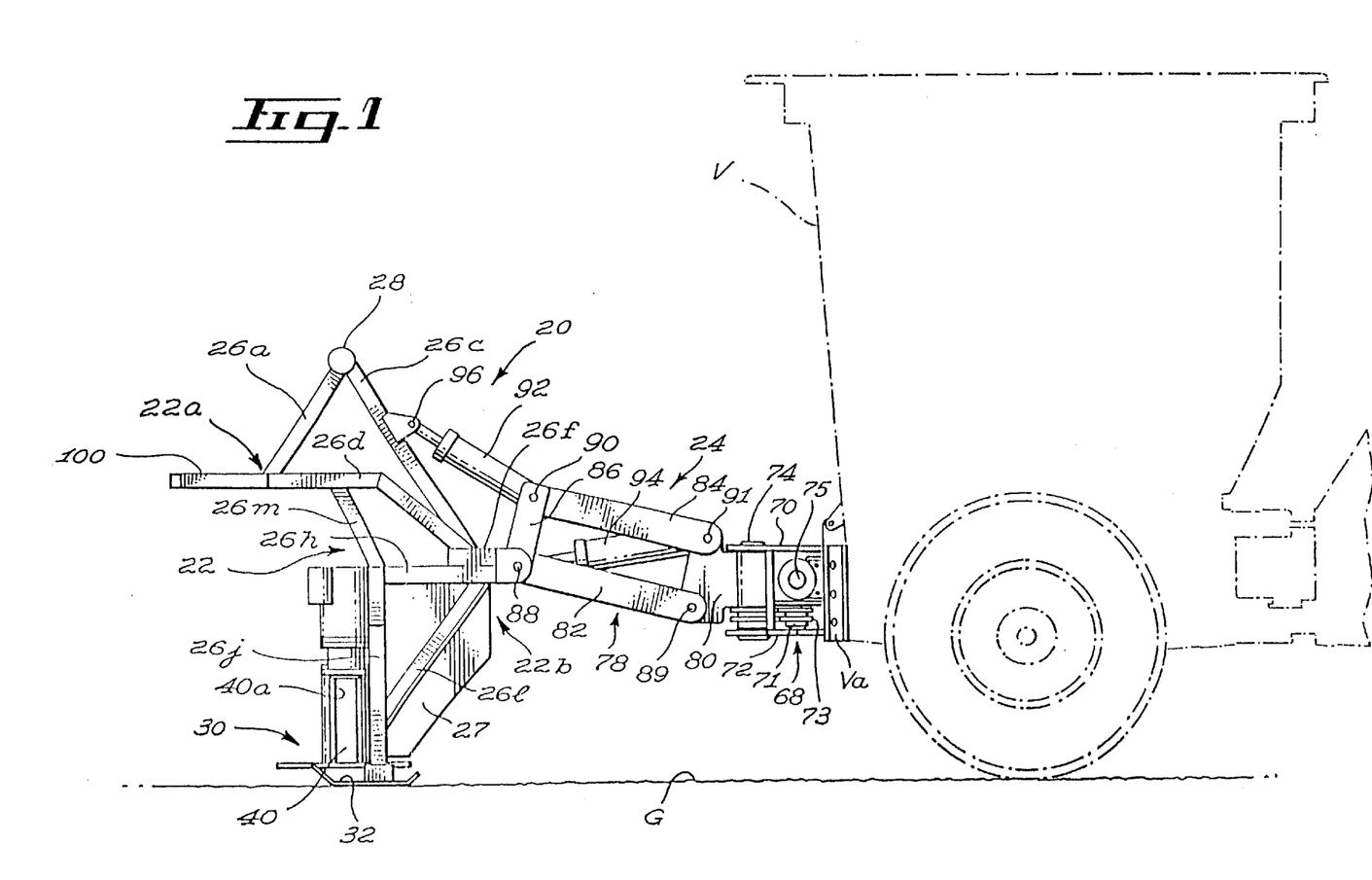
FIG. 1 is a side elevation of the felling head of the invention, with attachment coupling operatively installed on the front portion of a tractor vehicle shown in phantom lines, resting on flat even ground.
Figure 2:
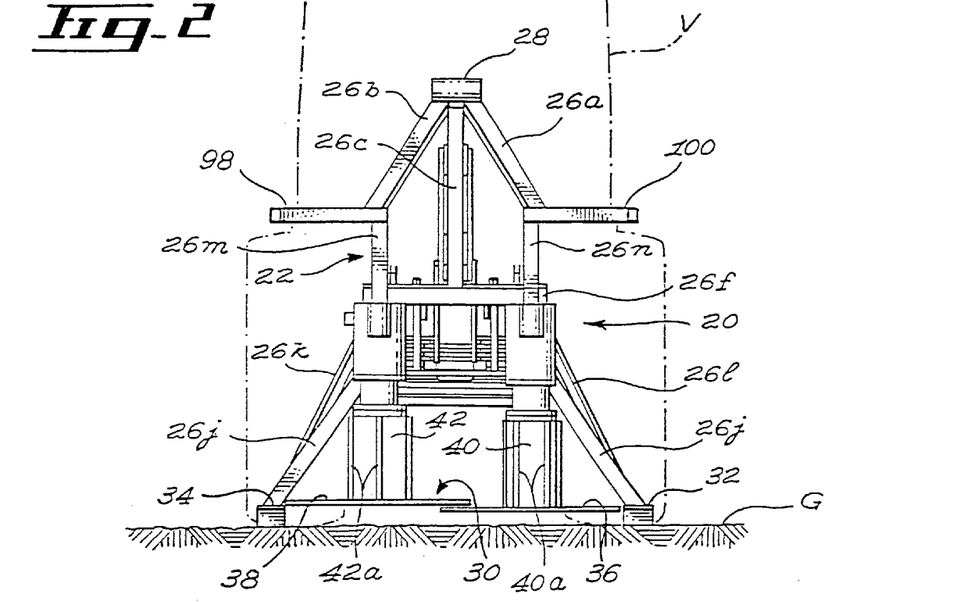
FIG. 2 is a front elevation of the felling head and tractor of FIG. 1, the tractor being again showed in phantom lines.
Figure 3:
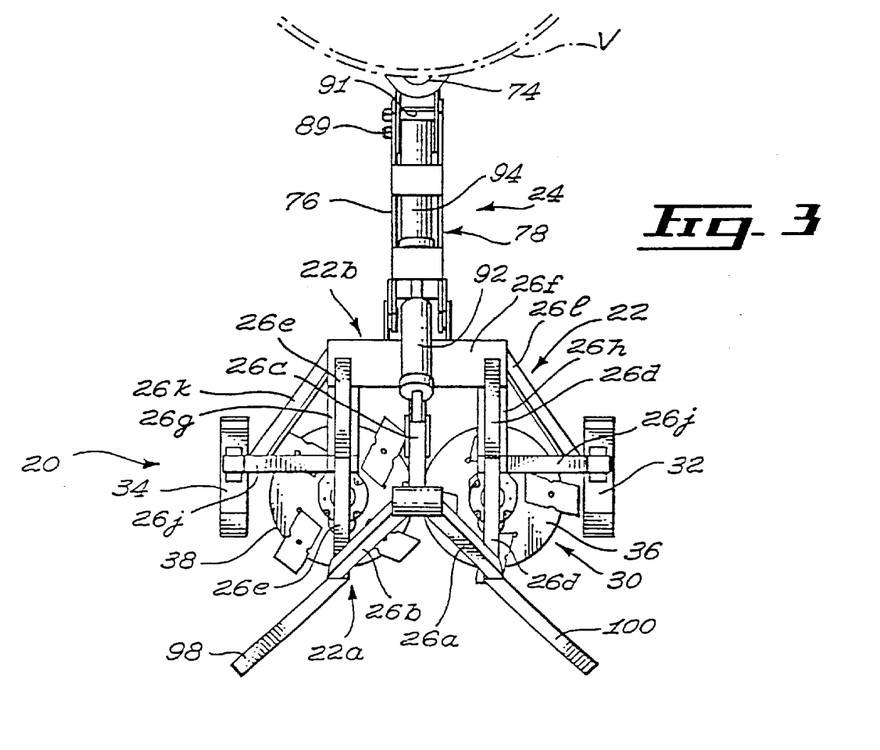
FIG. 3 is a top plan view of the felling head of the invention, suggesting in phantom lines the frontward end of the tractor vehicle ceiling, and showing the two circular blades thereof.

FIGS. 1 to 3 show a felling head 20 according to a preferred embodiment of the invention, for debrushing a terrain. As suggested in the drawings, felling head 20 is destined to be operatively installed at the front end of a tractor vehicle V, as known in the art.

Felling head 20 comprises a rigid workhead frame 22 defining a front end 22a and a rear end 22b, the latter being pivotally linked to the tractor vehicle V front end through the instrumentality of hinge means in the form of an attachment coupling 24, in a manner which will be described hereinafter.

Workhead frame 22 comprises a number of rigidly linked truss beams 26a to 26n. As shown in the drawings, three downwardly divergent top truss beams 26a, 26b, 26c form a pyramid-like apex at 28. The lower extremities of beams 26a, 26b are linked at the workhead frame front end 22a to downwardly elbowed side truss beams 26d, 26e, respectively. The latter, together with top beam 26c, are rearwardly oriented and all three are attached to an underlying horizontal plate 26f, from which frontwardly project two spaced-apart horizontal side beams 26g, 26h. Downwardly and outwardly inclined lateral beams 26i, 26j originate at the forward extremity of beams 26g, 26h and are reinforced by reinforcement beams 26k, 26l and by upwardly oriented short beams 26m, 26n. A pair of parallel, spaced-apart, downwardly extending deflector sheet plates 27, 27 depend from side beams 26g, 26h and are as long as the latter. In FIG. 1, only the left-hand side deflector plate 27 is visible, since the right-hand side deflector plate is hidden behind the latter.

Felling head 20 further comprises cutting members 30 (which will be further described hereinafter) operatively attached to workhead frame 22 and installed in an opening located centrally of said workhead frame 22, between lateral beams 26i, 26j; and also comprises elongated ground-engaging members in the form of a pair of elongated skates 32, 34 fixedly installed at the lower end of lateral beams 26i, 26j.

The particular configuration of workhead frame 22 is given as a preferred embodiment thereof, though it is understood that the invention is not limited thereto. Indeed, there are only a few essential features that workhead frame 22 must comprise, as follows:

a) it must have a very good overall rigidity, to prevent it from being bent or damaged during use, considering the important stresses which will be transmitted thereto;

b) it must have an open area at its lower central portion to receive the cutting members 30 therein; and c) it must have a pair of beams 26i, 26j that downwardly extend under cutting members 30 to support the skates 32, 34.

The configuration of the workhead frame is thus shown as being one functional embodiment thereof, though it is understood that other suitable configurations or truss beam arrangements would also be proper.

Figure 10:
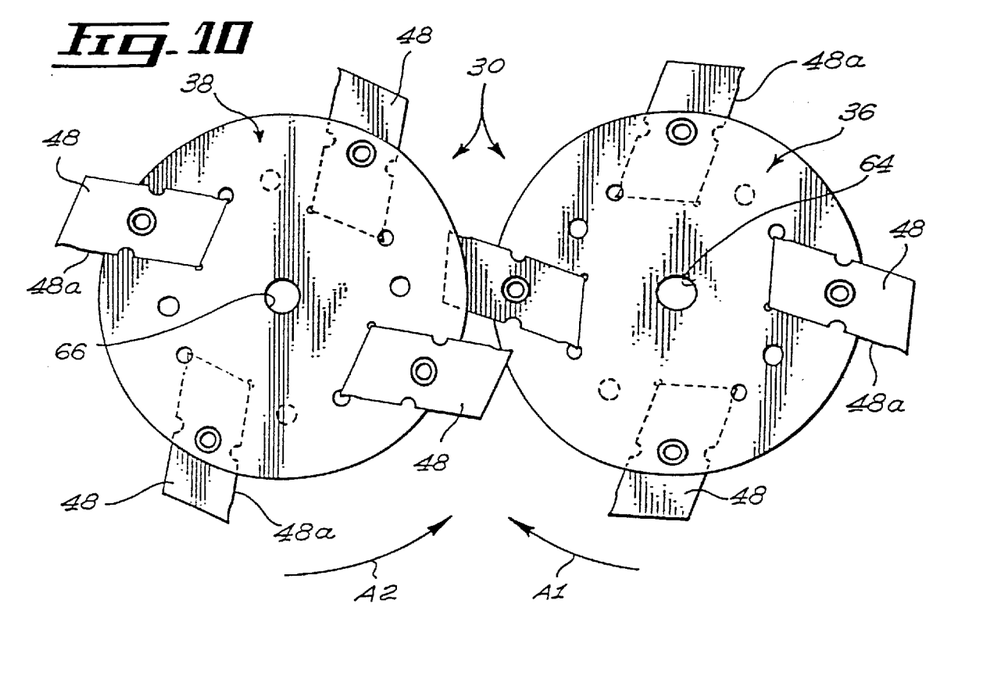
FIG. 10 is a top plan view of the pair of associated saw blade members at an enlarged scale, in operative position, suggesting their partly overlying rotational directions.

FIGS. 2, 3 and 10 show that cutting members 30 comprise a lower and an upper discoid saw blades 36, 38 rotatably mounted to workhead frame 22 spacedly parallel to ground between lateral beams 26i, 26j by means of vertical rotors 40, 42, with lower blade 36 being slightly vertically downwardly offset relative to upper blade 38.

Figure 9:
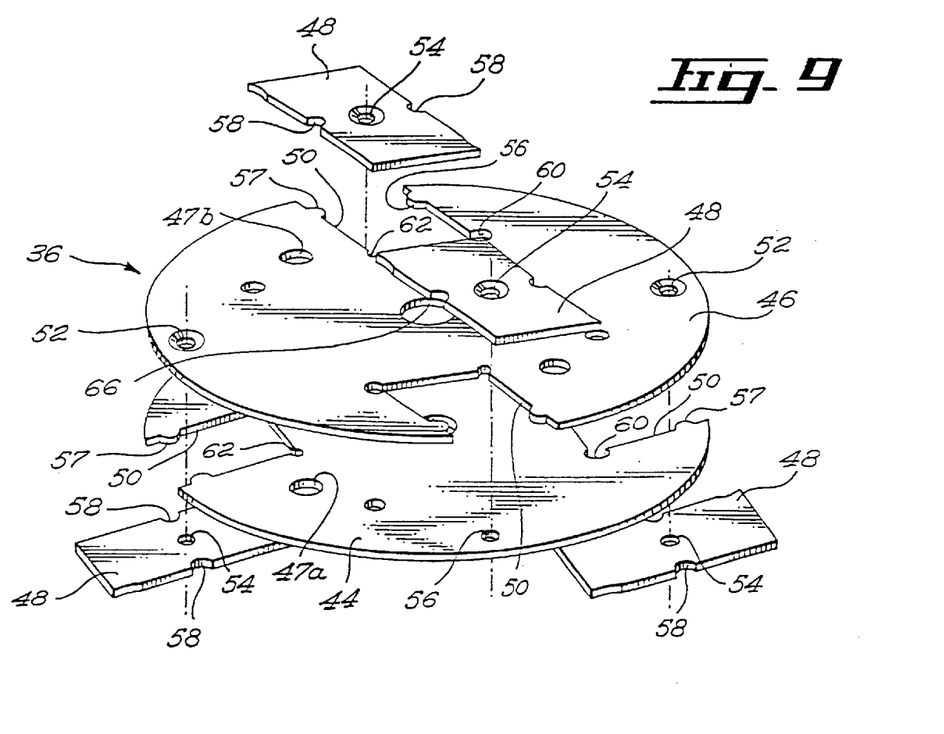
FIG. 9 is an exploded perspective view, at an enlarged scale, of a preferred embodiment of saw blade member of the invention.

FIG. 9 illustrates lower saw blade 36, though it is understood that upper saw blade 38 is identical thereto. Blade 36 comprises a lower and an upper adjacent, axially aligned, overlying, distinct and integrally fixed discs 44, 46 having an equal diameter and a common outer periphery. Discs 44, 46 are preferably welded to one another, and have welding holes 47a, 47b for providing welding edges at radially intermediate locations on the body of blade 36. Holes 47a are located on lower disc 44 and do not register with the holes 47b located on upper disc 46, so as to form access ports through which welding of the two discs can be accomplished. The pair of discs 44, 46 is provided with a number, e.g. four as shown in the drawings, of equally peripherally spaced, fixedly attached though removable quadrangular elongated teeth 48. Teeth 48 radially project beyond said outer periphery and are nested alternately under and over blade 36 in complementary quandrangular notches 50 made in the corresponding lower or upper disc 44, 46. That is to say, lower disc 44 has a pair of notches 50, 50, peripherally spaced by a 180° angle, which are each engaged by a saw tooth 48, each tooth 48 being sized to conformingly and nestingly fit into its corresponding notch 50 and fixedly rest against upper disc 46 therein by means of a bolt (not shown) engaging axially aligned bores 52, 54 in upper disc 46 and tooth 48, respectively. Upper disc 46 also has a pair of notches 50, 50 peripherally spaced by a 180° angle which are each engaged by a saw tooth 48, each tooth 48 being sized to conformingly and nestingly fit into its corresponding notch 50 and fixedly rest against lower disc 44 therein by means of a bolt (not shown) engaging axially aligned bores 56, 54 in lower disc 44 and tooth 48, respectively, with teeth 48 nested in upper disc 46 being positioned at a 90° angle relative to the teeth 48 nested in lower disc 44. The fact that teeth 48 are removable facilitates replacement thereof when they become worn or damaged during use.

Also, as best shown in FIG. 9, a pair of half-moon shaped ears 57 are located on the opposite side edges of each notch 50 and inwardly project therein, to conformingly engage complementary half-moon grooves 58 located on the teeth 48. The mating ears 57 and grooves 58 engagement helps prevent accidental undesirable radial disengagement of teeth 48 from blade 36 under load.

It can further be seen in FIGS. 9 and 10 that each notches 50 has at its inner corners small rounded grooves 60, 62, that help prevent structural integrity failure of the discs 44, 46 under load stress concentration at these particular stress concentration focal points.

Also, as shown in FIG. 10, the quadrangular teeth 48 are preferably not rectangular but rather have the shape of a parallelogram, and define a leading cutting edge 48a which is aligned with the diameter of the corresponding blade 36, 38. This confers a greater resistance to the blade assembly 36, 38, due to a partial distribution of the stress longitudinally in teeth 48, instead of solely transversely as would be the case were the teeth 48 to be rectangular.

Each blade 36, 38 is provided with an axial through-bore 64, 66 which is destined to be engaged by rotor 40, 42, respectively, for driving blades 36, 38 into rotation.

The cutting members 30 could be different from a pair of discoid saw blades 36, 38 as illustrated. For example, a single saw blade could be used instead of a pair of partly overlying saw blades, though it is understood that the latter is the preferred embodiment for the present invention and brings about the best results in debrushing. Other suitable cutting members could also be used.

In any event, cutting means 30 defines a lower flat surface that is destined to accomplish debrushing parallel to the ground and with a minimum ground clearance, for reasons that will be explained hereinafter. In the case of the preferred embodiment of the invention, this lower flat surface is defined by the lower blade 36. If there was to have only a single saw blade, then this blade would constitute the lower flat surface of cutting members 30.

As explained hereinabove, lower and upper blades 36, 38 are edgewisely overlapping, so as to have overlapping rotational cutting paths, slightly vertically spaced from one another. Furthermore, it can be seen in FIG. 10 that the angle of incidence of the teeth 48 is oriented in opposite rotational directions. Consequently, blades 36, 38 are destined to rotate in opposite directions, as suggested by arrows A1 and A2 in FIG. 10, to trap the brush between the two blades and thus combine a shearing effect of the two adjacent blades on the brush elements, to the distinct cutting effect of each blade 36, 38.

FIGS. 1 and 3 show that attachment coupling 24 comprises an anchoring member 68 fixedly attached to a chassis extension Va at the front end of the tractor vehicle V. Anchoring member 68 has a pair of vertically spaced-apart horizontal plates 70, 72 which hold a frontmost vertical pivot axle 74, the latter being power rotated for rotation in either clockwise or counterclockwise rotation by any suitable power means. For example, this power means could include a chain assembly 73, extending generally horizontally and meshing with the lower section of vertical pivot axle 74 and with an idle vertical stud 71 located between front axle 74 and rear attachment bracket Va. A horizontal hydraulic ram 75 extending orthogonally to axle 74 would power rotate axle 74 by conventional coupling with the gear chain 73, namely by anchoring its cylinder part to frame 70 and its piston end part to the idle stud 71, so that reciprocating horizontal motion of ram 75 will translate into rotational motion of the vertical axle 74.

Attachment coupling 24 further comprises a pair of rigid hinged truss parallelograms 76, 78 which are parallel to one another. Each hinged parallelogram, e.g. parallelogram 78 in FIG. 1, has a first plate 80 which is integrally carried by and horizontally pivots around pivot axle 74, a pair of parallel elongated laterally spaced bars 82, 84 hingedly and spacedly attached thereto, and a short frontmost transverse link bar 86 opposite plate 80 and hingedly linking the front ends of lateral bars 82 and 84. The pivot pin 88 joining the pairs of lower bars 82 and transverse bars 86 also pivotally mounts workhead frame horizontal plate 26f. A pivot pin 90 joining the pairs of upper bars 84 and transverse bars 86 also carries a ram 92. A third and a fourth pivot pins 89, 91 are located at the junction of lower bars 82 and plate 80, and at the junction of upper bars 84 and plate 80, respectively.

Pivots 88, 89, 90, 91 (FIGS. 1 and 3) link the corresponding bars of rigid parallelograms 76, 78 in a common pivotal movement. That is to say, each pivot stud 88, 89, 90, 91 extends transversely between the two parallelograms 76, 78, so that each corresponding corner thereof pivots around a same one pivot 88, 89, 90 or 91, but in any event, both parallelograms 76, 78 always move together and have a same position at any given time. The reason for the existence of two parallelograms 76, 78 is to improve the structural rigidity of attachment coupling 24.

The felling head 20 further comprises a front and a rear hydraulic cylinders 92, 94 centrally and longitudinally disposed. Rear cylinder 94 is pivotally installed at its rear extremity on pivot axle 91 and at its front extremity on pivot axle 88, while front cylinder 92 is pivotally installed at its rear extremity on pivot axle 90 and at its front extremity on a pivot axle 96 mounted on truss beam 26*c*, near apex 28.

Both hydraulic cylinders 92, 94, together with the saw blades rotors 40, 42 and the horizontal cylinder 75, are all remotely selectively controlled from a control box inside the driver's cab of the tractor vehicle V.

The elongated skates 32, 34 have a flat, horizontal main body destined to flatly slide upon the ground surface, and have end tips that are curved or bent upwards, to help skates 32, 34, to slide over uneven ground surfaces.

FIGS. 2 and 3 show that felling head 20 further comprises ground-spaced brush converging means in the form of a pair of rigid arms 98, 100 frontwardly projecting ahead of the upper portion of workhead frame front end 22*a* in a divergent fashion. Arms 98, 100 are integrally installed on workhead frame 22 at the junction of upper beams 26*a*, 26*b* with elbowed arms 26*d*, 26*e*, respectively, and are horizontally disposed, to effectively bias the brush elements towards the central part of rotors 40, 42, into the overlying most effective portion of blades 36, 38.

The brush converging means preferably further comprise ribbed sleeve members constituting the outer surface of rotors 40, 42, as shown in the drawings: the rotor sleeve members 40, 42 have several integral, peripherally spaced-apart, vertical ribs 40*a*, 42*a* (FIGS. 1 and 2) that will rotate simultaneously with counter rotating rotors 40, 42 to also effectively bias the brush elements towards the central portion of rotors 40, 42, and to shear with the cutting edges of ribs 40*a*, 42*a* the brush at a height intermediate cutting members 30 and arms 98, 100.

In use, as shown in FIGS. 1 to 3, the felling head 22 is destined to be attached at the front end of a tractor vehicle V, by means of anchoring member 68, and is destined to rest on the ground G in operative position. Felling head 20 is correctly sized to allow skates 32 to be located under the cutting means lower surface, i.e. lateral beams 26*i*, 26*j* downwardly extend beyond the level of the cutting means lower blade 36, where skates 32, 34 are located. Felling head 32 engages the ground with skates 32, 34, and blades 36, 38 may thus be kept positioned spacedly over ground, this ground clearance being due to their rigid link with skates 32, 34 by means of workhead frame 22. The ground clearance of blades 36, 38 is preferably between 5 and 7,5 centimeters, although any suitable desired ground clearance may be chosen when assembling the felling head 20. In this respect, it is envisioned that there be provided means for adjusting in situ the ground clearance of blades 36, 38 relative to the ground, e.g. by including telescopic lateral beams 26*i*, 26*j* that support skates 32, 34.

Figures 4, 5:
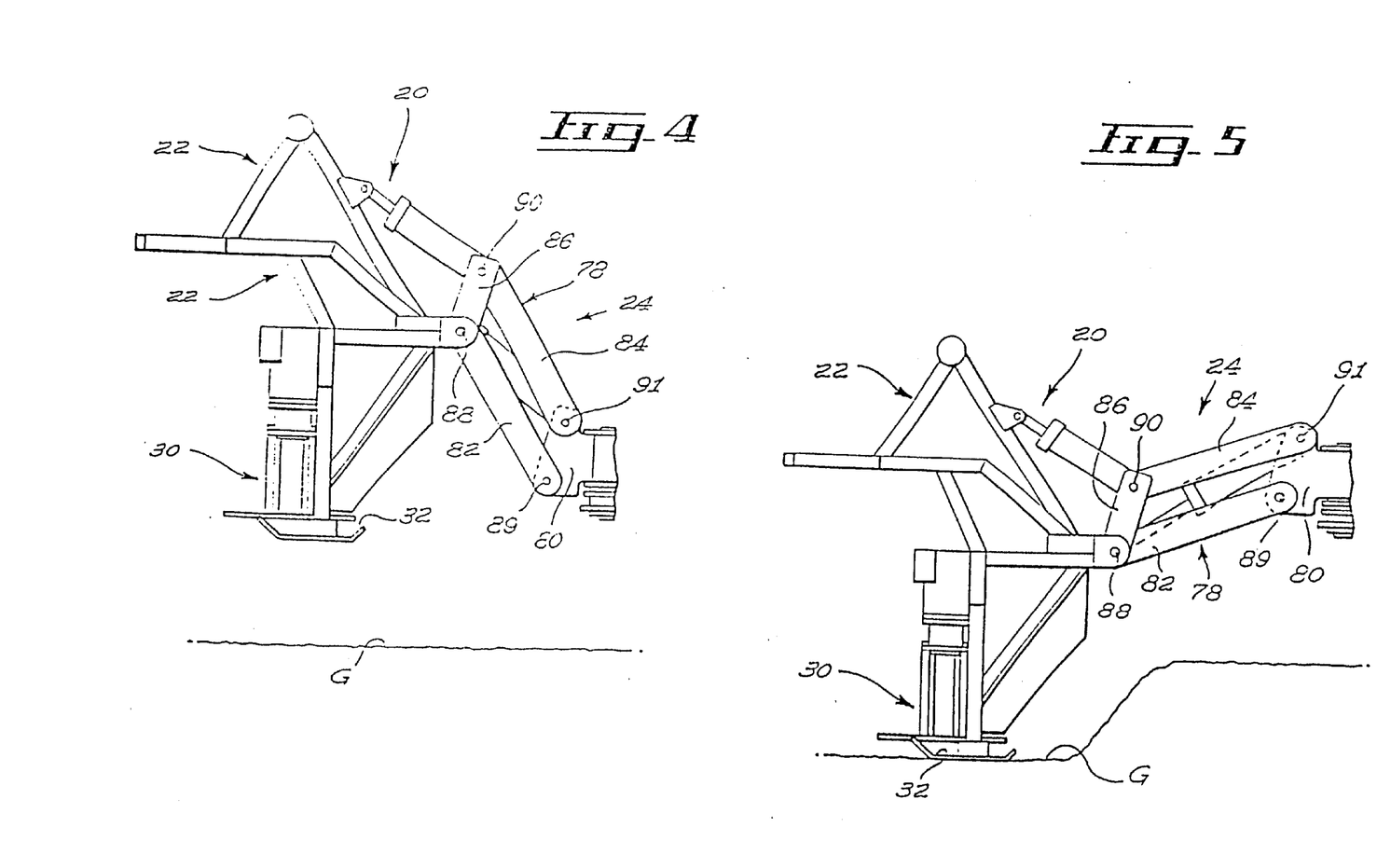
FIG. 4 is a side elevation of the felling head of the invention, with the workhead frame being power displaced to a raised position relative to the ground as a result from a linear, non-pivotal vertical displacement.
FIGS. 5 to 7 are side elevations showing the felling head in various operative ground-engaging position, over different uneven or inclined ground conditions, with corresponding vertical linear and/or pivotal displacement of the workhead frame, so as to suggest the considerable manoeuvrability thereof.

When the tractor vehicle V advances to accomplish its debrushing operation, the incoming upstanding brush elements (small trees, plants, etc . . . ) will converge towards the discoid saw blades 36, 38 under the bias of convergent arms 98, 100 and of the ribbed rotor sleeves 40, 42, to be felled at a section thereof just above ground level. As shown in FIG. 4, the vehicle operator may decide to lift the felling head 22 spacedly over ground, in a raised position, either to move at greater speed without debrushing a terrain, or to temporarily accomplish debrushing at higher above-ground level. Usually, however, the felling head 22 will be used with its skates 32, 34 engaging the ground during debrushing operations; this last position is called the "felling head operative debrushing position".

FIGS. 4 to 7 suggest the high versatility of the invention, characterized by the combination of the elongated ground-engaging skates 32, 34 with the truss parallelograms 76, 78. The hinged though rigid parallelograms 76, 78 allow:

a) a pivotal displacement of workhead frame 22 about a horizontal axis (FIGS. 6 and 7), i.e. in a vertical plane parallel to the direction of travel of the tractor vehicle when the latter is aligned with the workhead frame 22; this pivotal displacement can be mainly controlled by retracting/extracting the piston rod of front cylinder 92; and b) a linear, non-pivotal vertical displacement of workhead frame 22 relative to the tractor vehicle (FIGS. 4 and 5); this vertical linear displacement can be mainly controlled by retracting/extracting the piston rod of rear cylinder 94.

Figure 8:
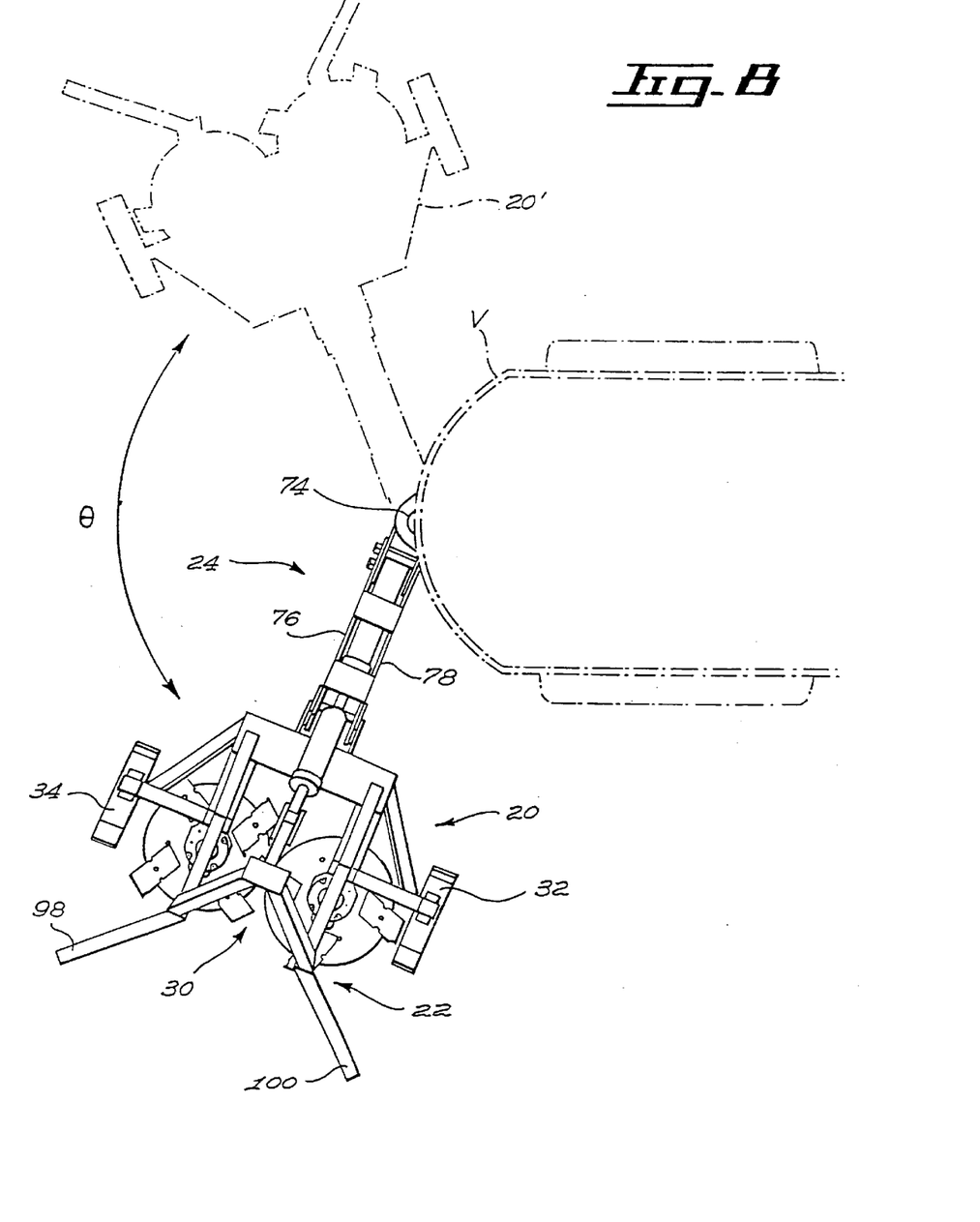
FIG. 8 is a top plan view of the felling head, installed on the front portion of a tractor vehicle illustrated in phantom lines and sidewardly pivoted relative to the frontward direction of travel of the tractor vehicle, and further suggesting an alternate opposite sideward pivoted position of the felling head in phantom lines, to show the wide range of horizontal pivotal displacement of the felling head relative to the tractor vehicle vertical attachment coupling axle.

Furthermore, FIG. 8 shows that the vertical pivot axle 74 allows the felling head 20 to pivot within a horizontal plane from a first left-hand side limit position at 20 (shown in full lines in FIG. 8) to a second right-hand side limit position at 20' (shown in phantom lines in FIG. 8). The maximum angle θ between these two limit positions is approximately 135°, though it is understood that with only minor modifications to the present felling head configuration, it could be possible to allow pivotal movement of the felling head over a much wider range, e.g. equal to or even more than 180°.

Figure 6:
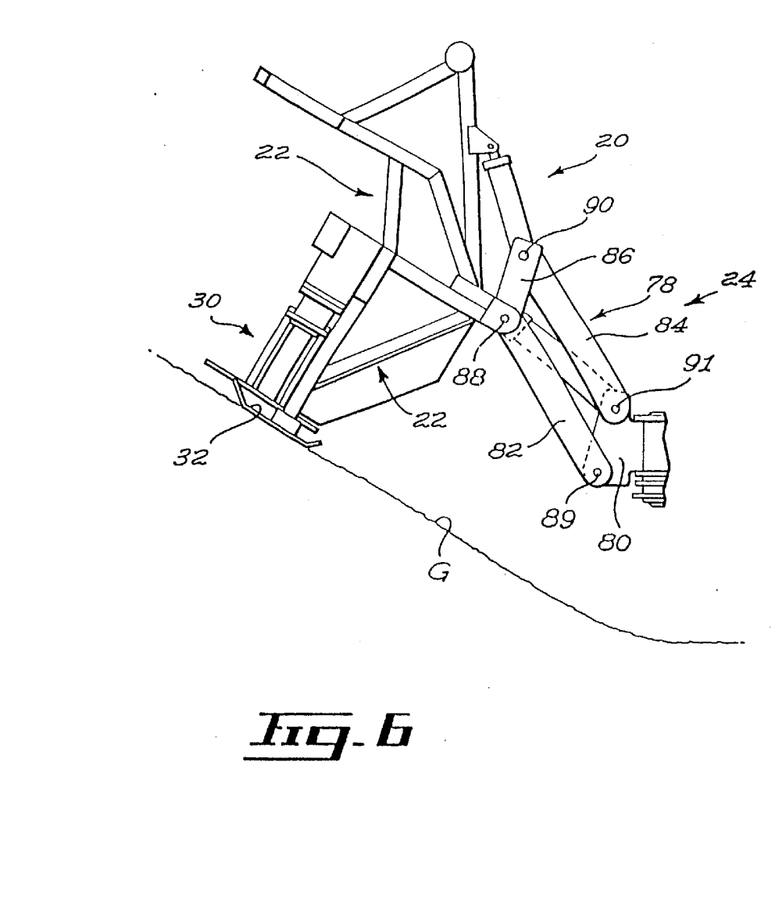
Figure 7:
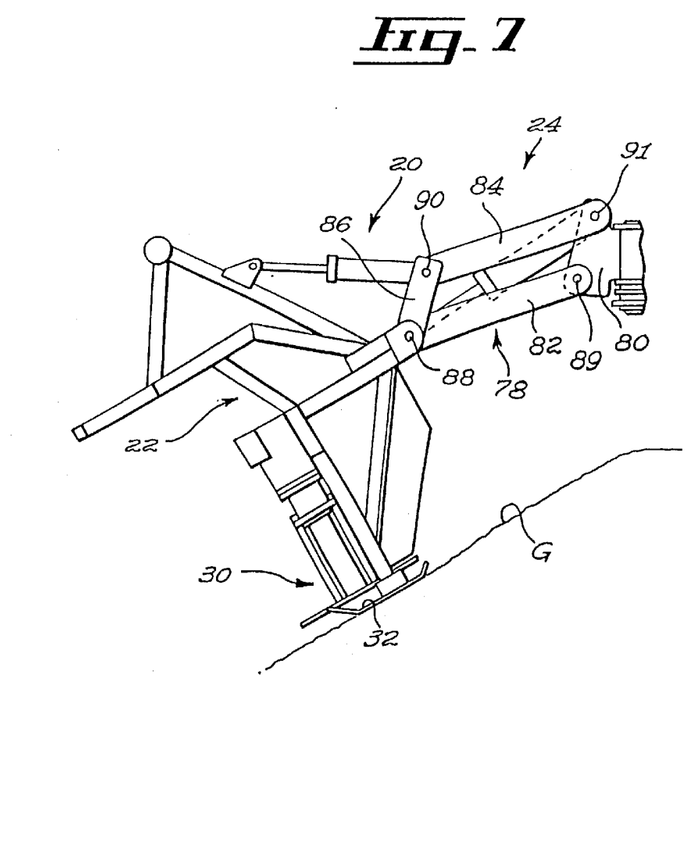

Thus, it can be seen in FIGS. 4 to 8 that the felling head according to the present invention can be controlled so as to be moved in many different directions. As seen in FIG. 5, when the ground G is lower under felling head 20 than under the tractor vehicle, felling head 20 can be positioned vertically lower than under flat ground conditions to engage the ground and continue its debrushing operation undisturbed. In FIGS. 6 and 7, it is shown that although there is a sudden angular difference between the ground under the felling head 20 and the tractor vehicle, the saw blades will be allowed to remain parallel to the ground directly under them and thus continue their debrushing operation. Indeed, the elongated skates 32, 34, having bent extremities, can gradually slidingly engage the sloping ground surface, concurrently biasing the integrally linked workhead 22 into a corresponding pivotal movement. The skates will be forced towards a flat engagement with the ground under the load of workhead frame 22, and thus the parallel blades 36, 38 will also be biased automatically towards a position parallel to the ground, without any intervention from the tractor vehicle driver.

Thus, it is understood that the felling head 20 of the present invention allows a much greater freedom of movement than the prior art devices. Indeed, it is rather free to move in independent directions relative to the tractor vehicle to which it is attached. This freedom of movement is acquired through the instrumentality of the parallelogram hinge means 24, together with the hydraulic attachment pivot assembly 74, the components of the latter being already known in the art.

Workhead frame 22 may accomplish its linear vertical displacement and its vertical pivotal movement either without any intervention of the vehicle driver, under the bias of its own weight upon skates 32, 34 engaging an uneven or sloping ground surface, or under the selected intervention of the driver, who can activate one or both hydraulic cylinders to correspondingly move the workhead frame 22. The horizontal pivotal displacement, however, can only be accomplished through a selected intervention of the driver, and cannot be left to move freely under the ground surface impulses thereon, for in this latter case it would be difficult or even impossible to control the direction of the workhead frame 22.

It is compulsory that the ground-engaging skates be elongated to confer a linear ground engagement to workhead frame 22, thus to ensure that the workhead frame 22 will tilt upwardly upon the skates engaging an inclined terrain. This is a major advantage over the prior art Mellgren patent cited in the Background of the Invention section of this disclosure, in which the semi-spherical skid hub conferred a narrow, almost punctual, ground engagement to the workhead frame, thus only allowing the workhead frame to tilt or pivot under engagement of inclined or uneven terrain around the rearwardly positioned pivotal axis. Due to the length of the pivotal lever in the Mellgren patent, this pivotal movement is substantially equal to a linear vertical displacement, and no effective tilting of the skid hub is accomplished to compensate for uneven ground surfaces.

It is envisioned that other ground engaging means be used instead of skates. For example, each skate could be replaced by at least one pair of wheels aligned towards the front end of the workhead frame, which would ensure a linear contact of the ground engaging means with the ground at all times, to tilt the workhead frame accordingly under displacement over uneven or inclined terrain. Also, caterpilar endless chain bands could be used. In any event, the ground-engaging means must be elongated, for reasons explained hereinabove.

The hydraulic cylinders 92, 94 have an additional advantage, in that they dampen the movements of workhead frame 22 during temporary upward swinging motions responsive to ground surface irregularities.

Also, another advantage of the double blade configuration of the saw blades is that the brush which has been cut down will mostly accumulate in a furrow-like heap centrally between the tree rows, due to the centrally convergent counter rotational directions of two saw blades. This will help to clear the portion of the rows close to the trees, where the workmen will have to manually finish the debrushing job between the trees of a same row. Thus, the cut-down brush will be less likely to be in their way, due to its mostly central location. Also, the purpose of the pair of rearwardly projecting parallel deflector plates 27, 27 located behind rotors 40, 42 is to deflect most of the brush thrust outwardly by the high-velocity counter rotating blades 36, 38 into the furrow-like heap.

It is understood that any modifications which do not deviate from the scope of the present invention are considered to be included therein. For example, the brush converging means could also be full light-weight panels or tubular arcuate arms.

Also, it could be possible to manufacture the felling head of the invention without any of the two hydraulic cylinders, though it would then become impossible to remotely and selectively raise the workhead frame above ground unless other means are incorporated on the felling head therefor.

It is understood that throughout the present document, when reference to horizontal or vertical directions is made, this is done in view of the tractor vehicle and felling head being aligned with one another and positioned over straight, flat, even, horizontal ground. Of course, it is possible and likely that the tractor vehicle and felling head will eventually engage uneven or non horizontal ground: appropriate directions would then obviously have to be suitably substituted.

I claim:

1. A felling head for debrushing brush covered terrain, destined to be operatively installed at the front end of a tractor vehicle, comprising:

a) a rigid workhead frame defining a front end and a rear end;

b) at least one hinged parallelogram member including four hinged, rigid bars, for pivotally linking said workhead frame to the tractor vehicle and for allowing at least pivotal displacement about a horizontal axis and a linear vertical displacement of said workhead frame relative to the tractor vehicle;

c) a cutting member defining a flat lower surface and installed on said workhead frame front end, said cutting member lower surface being destined to clear ground level and to be substantially parallel thereto in an operative debrushing position;

d) at least two laterally spaced elongated ground engaging members, fixedly and integrally anchored to said workhead frame, located vertically beneath the plane of said flat cutting member lower surface and being parallel thereto;

e) hydraulic cylinders acting on said hinged parallelogram member and on said workhead frame for selectively and remotely controlling the vertical position and the orientation around a horizontal axis of said workhead frame relative to the tractor vehicle; and f) a power device, for rotatingly powering at least said cutting member and for powering said hydraulic cylinders;

wherein in said operative debrushing position, said ground engaging members continuously engage the ground under the bias of the load of said workhead frame during forward motion of said tractor vehicle, to maintain said cutting member flat lower surface substantially parallel to the ground and to maintain automatic ground clearance thereof, said hydraulic cylinders dampening vertical movements of said workhead frame when said ground engaging members temporarily release ground under major ground surface variations.

2. A felling head as defined in claim 1, wherein said cutting member comprises a lower and an upper discoid saw blades rotatably fixed to said workhead frame so as to be rotatable in opposite directions, with said lower blade being slightly vertically downwardly offset relative to said upper blade and constituting said cutting member flat lower surface, said lower and upper blades having vertically partly overlapping rotational cutting paths.

3. A felling head as defined in claim 2, wherein each said discoid saw blade comprises a lower and an upper adjacent, axially aligned, overlying, distinct and integrally fixed discs having a common outer periphery, said discs being provided with a number of equally peripherally spaced, fixedly attached through removable teeth radially projecting beyond said outer periphery and nested alternately under and over said blade in openings made in the corresponding said lower or upper disc.

4. A felling head as defined in claim 2, further comprising a brush converging device integrally installed on said workhead frame and projecting ahead of said front end in a divergent fashion, for biasing the brush in a convergent fashion towards said pair of saw blades.

5. A felling head as defined in claim 4, wherein said brush converging device comprises a pair of rigid arms frontwardly projecting ahead of said workhead frame front end in a divergent fashion.

6. A felling head as defined in claim 1, wherein said hinge parallelogram member comprises a horizontal pivot member for further selectively allowing sideward pivotal displacement of said workhead frame.

7. A felling head as defined in claim 1, wherein said ground engaging members are flat, elongated, laterally spaced-apart skates integrally installed on said workhead frame near said cutting members.

8. A felling head for debrushing brush covered terrain, destined to be operatively installed at the front end of a tractor vehicle, comprising:
   a) a rigid workhead frame defining a front end and a rear end;
   b) hinge member comprising a pair of parallel parallelograms forced into common pivotal movements, each said parallelogram having four rigid bars hingedly attached so as to form a parallelogram, said hinge member being destined to pivotally link said workhead frame to the tractor vehicle and to allow pivotal displacement about a horizontal axis and a linear vertical displacement of said workhead frame relative to the tractor vehicle;
   c) a lower and an upper discoid saw blades rotatably fixed to said workhead frame so as to be rotatable in opposite directions, with said lower blade being slightly vertically downwardly offset relative to said upper blade, said lower and upper blades having vertically partly overlying rotational cutting paths, said lower saw blade being destined to be located slightly over ground and substantially parallel thereto in an operative debrushing position;
   d) a pair of flat, elongated, laterally spaced-apart skates integrally and fixedly installed on said workhead frame near said saw blades, being parallel thereto and at least slightly under the level thereof;
   e) a pair of hydraulic cylinders acting on said parallelograms and on said workhead frame for selectively and remotely controlling the vertical position and the orientation around a horizontal axis of said workhead frame relative to the tractor vehicle, and further for dampening the movements of said workhead frame when severe ground level gradients are encountered; and
   f) a power device, for powering said saw blades into rotation and for powering said hydraulic cylinders;
wherein in said operative debrushing position, said skates continuously engage the ground under the bias of the load of said workhead frame during forward motion of said tractor vehicle, to maintain said lower and upper blades substantially parallel to the ground and to maintain automatic ground clearance thereof.

9. A felling head as defined in claim 8, further comprising a brush converging device in the form of a pair of rigid arms integrally installed on said workhead frame and frontwardly projecting ahead of said workhead frame front end in a divergent fashion, for biasing incoming brush in a convergent fashion towards said pair of saw blades as the tractor vehicle moves ahead.

10. A felling head as defined in claim 8, wherein said hinge member further comprises a horizontal pivot for further selectively allowing sideward pivotal displacement of said workhead frame.

11. A felling head assembly for attachment to the chassis of a motor vehicle ahead thereof, the felling head assembly comprising:
   a) an open rigid main frame;
   b) a pair of first and second saw mounts, rotatably mounted to said main frame parallel to one another and in laterally spaced fashion, each saw mount including an elongated upright rotatable shaft, a housing for enclosing at least part of said shaft, and a rotatable cutting blade transversely mounted integrally to a bottom end of each said shaft and adapted to cut about a horizontal plane, with each of said cutting blades defining a peripheral cutting edge margin;
   c) a first power device, for power rotating said first and second rotatable shafts in counterrotation relative to one another;
   d) a pair of fore and aft extending longitudinal skate members, mounted on laterally opposite sections of the bottom face of said main frame and located in radially outwardly spaced fashion from the corresponding said counterrotating blades, said skate members extending within a plane parallel to and being downwardly offset from said saw blades so that a ground clearance is positively maintained between said saw blades including said peripheral cutting edge margins thereof and the underlying ground level, for preventing blade damage as well as for providing optimum brush stumps felling height;
   e) an attachment member, for releasable coupling of said felling head to the motor vehicle, and including a parallelogram linkage, hingedly mounted at its front end to said felling head main frame for both up and down motion and concurrent fore and aft motion of said felling head, and a hitch coupling, for pivotally mounting the rear end of said parallelogram linkage to a hitch anchor member integral to the motor vehicle chassis for lateral shifting motion of said felling head sidewisely of the motor vehicle; and
   f) a second power device, including an integral dampening device and cooperating with said parallelogram linkage to maintain said saw blades within a selected planar cutting orientation relative to ground; said second power device further enabling power fore and aft tilting, power lifting, power lowering, and lateral power tilting of said felling head main frame and associated cutting blades relative to the motor vehicle, said second power device further providing dampening effect on the swinging motions of said felling head responsively to ground level irregularities upon forward displacement of the motor vehicle.

12. A felling head assembly as defined in claim 11, wherein said laterally spaced cutting blades of said first and second saw mounts extend within vertically offset planes and edgewisely overlap about a vertically registering section of each of their said cutting edge margins.

13. A felling head assembly as defined in claim 12, further including a pair of forwardly outwardly diverging arms, extending forwardly from an upper portion of said felling head main frame.

14. A felling head assembly as defined in claim 13, with each said rotatable shafts further including a few axial ribs of polygonal cross-section forming axial corners, said ribs rotatable with said shafts wherein the polygonal corners of said ribs form shearing edges for shearing incoming scrubs limbs at a level intermediate the lower said blades and the upper said forwardly upwardly diverging arms.

15. A felling head assembly as defined in claim 14, further including a reversible third power device, to power pivot said hitch coupling around the vehicle motor hitch anchor member, wherein lateral sidewise motion of the felling head can be controlled.

16. A felling head assembly as defined in claim 14, further including two vertical panels, integrally carried by said main frame behind said vertical shafts for biasing incoming brush within a narrow band downstream of said felling head saw blades.

17. A felling head assembly as defined in claim 15, wherein said first, second and third power devices are hydraulic rams coupled to a hydraulic network, said hydraulic rams being remote-controlled by the motor vehicle operator from a control box located inside the cabin of the motor vehicle.

* * * * *